United States Patent
Ishizuka et al.

[11] Patent Number: 5,930,245
[45] Date of Patent: Jul. 27, 1999

[54] RADIO TELEPHONE APPARATUS FOR PERFORMING SPACE DIVERSITY RECEPTION TO COMMUNICATE WITH BASE STATIONS IN A TDMA RADIO COMMUNICATION SYSTEM

[75] Inventors: Seijiro Ishizuka; Kazuto Kitakubo, both of Tokyo, Japan

[73] Assignee: Sony Corporation, Tokyo, Japan

[21] Appl. No.: 08/722,578

[22] Filed: Oct. 1, 1996

[30] Foreign Application Priority Data

Oct. 3, 1995 [JP] Japan .................................. 7-255916

[51] Int. Cl.⁶ .......................... H04B 7/216; H04B 7/212; H04J 3/00; H04Q 5/14
[52] U.S. Cl. .......................... 370/337; 370/324; 370/331; 370/522; 370/528; 455/403; 455/422; 455/553; 375/232
[58] Field of Search .................................... 370/337, 331, 370/522, 528, 320, 330, 339, 324, 508; 375/232, 347, 356, 368, 202, 341, 349, 348, 206; 455/13.2, 135, 456, 507, 101, 440, 403, 422, 453

[56] References Cited

U.S. PATENT DOCUMENTS

| | | | |
|---|---|---|---|
| 4,486,624 | 12/1984 | Puhl et al. ............................ | 370/278 |
| 5,392,054 | 2/1995 | Bottomley et al. ..................... | 343/702 |
| 5,740,531 | 4/1998 | Okada .................................... | 455/403 |
| 5,852,604 | 12/1998 | Cooley et al. ......................... | 370/324 |

*Primary Examiner*—Jason Chan
*Assistant Examiner*—Melissa Kay Carman
*Attorney, Agent, or Firm*—Jay H. Maioli

[57] ABSTRACT

A radio telephone apparatus for performing space diversity reception to communicate with base stations in a TDMA radio communication system under an operating condition in which a frame period containing a signal transmission period, a signal reception period and a base station observation period is provided, which comprises first and second antennas for signal transmission in the signal transmission period, the space diversity reception prior to each of the signal reception period and the base station observation period and signal reception in each of the signal reception period and the base station observation period, and an antenna selector operative to select one of the first and second antennas in accordance with space diversity technique to be used for receiving a data signal from a specific base station in the signal reception period and to select further one of the first and second antennas in accordance with space diversity technique to be used for receiving a data signal from one of base stations other than the specific base station in the base station observation period.

18 Claims, 5 Drawing Sheets

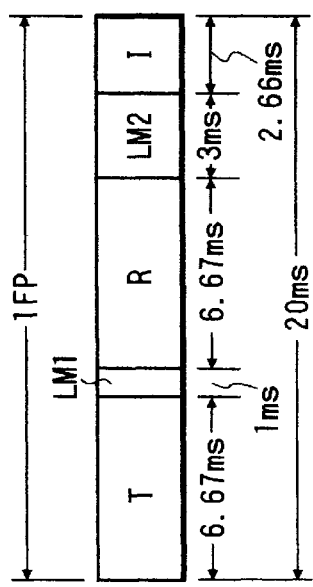
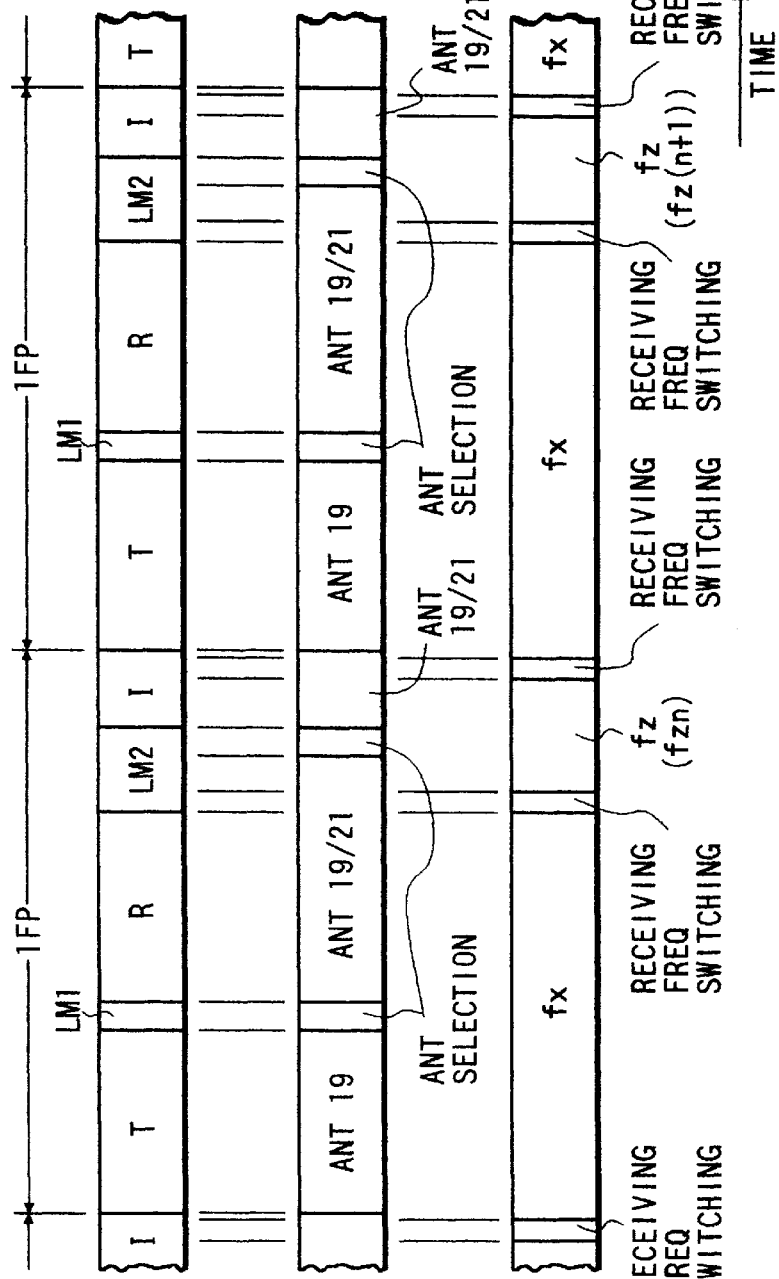
FIG. 4
FIG. 5A
FIG. 5B
FIG. 5C

RADIO TELEPHONE APPARATUS FOR PERFORMING SPACE DIVERSITY RECEPTION TO COMMUNICATE WITH BASE STATIONS IN A TDMA RADIO COMMUNICATION SYSTEM

BACKGROUND OF THE INVENTION

1. Field of the Invention

The present invention relates generally to radio telephone apparatus for performing space diversity reception to communicate with base stations provided under a TDMA (Time Division Multiple Access) radio communication system, and is directed to an improvement in a TDMA radio telephone apparatus suitable for use as a mobile telephone equipment operative to communicate with a plurality of dispersed base stations.

2. Description of the Prior Art

There has been proposed, as one of TDMA radio communication systems, a digital cellular telephone system in which a service area is divided into a plurality of service blocks each called a cell and a single base station is located in each cell. In the digital cellular telephone system, communications between subscribers in the service area are carried out through the base stations located respectively in the cells. This means that a TDMA radio telephone apparatus used by each subscriber in the service area is operative to transmit a data signal to the base station and receives a data signal from the base station. The TDMA radio telephone apparatus is likely to be installed in a vehicle to constitute a mobile telephone equipment.

FIG. 1 shows an example of a service area provided under the digital cellular telephone system in which base stations are located. In the example shown in FIG. 1, the service area includes seven cells CA, CB, CC, CD, CE, CF and CG and base stations Sa, Sb, Sc, Sd, Se, Sf and Sg are located in the cells CA to CG, respectively. Each of the base stations Sa to Sg is connected with a MTSO (Mobile Telephone Switching Office). A TDMA radio telephone apparatus MS used by the subscriber in the cell CA, for example, is operative to select the base stations Sa located in the cell CA as a specific base station corresponding thereto so as to communicate with the base stations Sa.

The communication between each of the TDMA radio telephone apparatus and the base stations in the service area is made in accordance with the TDMA method. The TDMA radio telephone apparatus used by the subscriber, which is, for example, installed in a vehicle to constitute the mobile telephone equipment, is provided with a couple of antennas, one of which is used for both transmission and reception of data signals and one of which is selected by an antenna selecting portion in accordance with space diversity technique on the occasion of the reception of a data signal.

For the communication between each of the TDMA radio telephone apparatus and the base stations in the service area, a unit period of time called a frame period (FP), an example of which is shown in FIG. 2, is provided to be repeated. In the frame period shown in FIG. 2, the whole duration corresponds to 20 ms as indicated with 1 FP and is divided into four segmental periods including a signal transmission period (T) of 6.67 ms, an antenna selecting operation period (LM) of 1 ms, a signal reception period (R) of 6.67 ms and a base station observation period (I) of 5.66 ms.

When the TDMA radio telephone apparatus is actually used by the subscriber in the service area, a data signal from the radio telephone apparatus is transmitted, through one of the antennas provided on the TDMA radio telephone apparatus, to the specific base station which is located in the cell wherein the TDMA radio telephone apparatus is positioned, such as the base station Sa for the TDMA radio telephone apparatus MS shown in FIG. 2, in the signal transmission period contained in each frame period. In the antenna selecting operation period contained in each frame period, one of the antennas provided on the TDMA radio telephone apparatus is selected by the antenna selecting portion in accordance with space diversity technique, and in the signal reception period contained in each frame period, a data signal from the specific base station is received by the radio telephone apparatus through the antenna selected by the antenna selecting portion, so that a space diversity reception is conducted. Further, in the base station observation period contained in each frame period, a data signal from one of the base stations located respectively in the cells adjacent to the cell wherein the specific base station is located, such as the base stations Cb to Cg for the radio telephone apparatus MS shown in FIG. 2, is received by the TDMA radio telephone apparatus through the antenna selected by the antenna selecting portion, so that a receiving condition of the data signal from one of the base stations located respectively in the cells adjacent to the cell wherein the specific base station is located is observed. The data signal from one of the base stations located respectively in the cells adjacent to the cell wherein the specific base station is located has a carrier frequency different from that of the data signal from the specific base station.

The result of observation of the receiving condition of the data signal from one of the base stations located respectively in the cells adjacent to the cell wherein the specific base station, which is obtained in each frame period, is transmitted from the TDMA radio telephone apparatus, together with a data signal, to the specific base station in the signal transmission period contained in the next frame period.

In the TDMA radio telephone apparatus in which the space diversity reception is performed as described above when the data signal from the specific base station or one of the base stations located respectively in the cells adjacent to the cell wherein the specific base station is received, one of the antennas provided on the TDMA radio telephone apparatus is selected by the antenna selecting portion in accordance with space diversity technique in the antenna selecting operation period contained in each frame period and therefore the data signal from the specific base station is satisfactorily received through the selected antenna in the data reception period next to the antenna selecting operation period in each frame period.

However, it is not guaranteed that the receiving condition of the data signal from one of the base stations located respectively in the cells adjacent to the cell wherein the specific base station is located is detected under a condition in which the data signal from one of the base stations located respectively in the cells adjacent to the cell wherein the specific base station is located is also satisfactorily received through the selected antenna in the base station observation period next to the signal reception period in each frame period. The reason for this is that the data signal from one of the base stations located respectively in the cells adjacent to the cell wherein the specific base station is located has the carrier frequency different from that of the data signal from the specific base station and therefore the receiving condition in which the data signal from one of the base stations located respectively in the cells adjacent to the cell wherein the specific base station is located is received through the antenna selected in the antenna selecting operation period is almost different from the receiving condition in which the data signal from the specific base station is received through the antenna selected in the antenna selecting operation period.

Consequently, under the situation in which one of the antennas provided on the TDMA radio telephone apparatus is selected by the antenna selecting portion in accordance with space diversity technique in the antenna selecting operation period contained in each frame period and the selected antenna is used for receiving the data signals in both of the signal reception period and the base station observation period next to the signal reception period, it is feared that, although the data signal from the specific base station is satisfactorily received through the selected antenna in the data reception period next to the antenna selecting operation period, the data signal from one of the base stations located respectively in the cells adjacent to the cell wherein the specific base station is located is unsatisfactorily received through the selected antenna to be subjected to observation of the receiving condition thereof in the base station observation period next to the signal reception period. In the case where the data signal from one of the base stations located respectively in the cells adjacent to the cell wherein the specific base station is located is unsatisfactorily received through the selected antenna in the base station observation period, a wrong result of the observation of the receiving condition of the data signal from one of the base stations located respectively in the cells adjacent to the cell wherein the specific base station is located is obtained in the base station observation period and the wrong result thus obtained is undesirably transmitted from the TDMA radio telephone apparatus, together with a data signal, to the specific base station in the signal transmission period next to the base station observation period.

OBJECTS AND SUMMARY OF THE INVENTION

Accordingly, it is an object of the present invention to provide a radio telephone apparatus for performing space diversity reception to communicate with base stations in a TDMA radio communication system, which avoids the aforementioned difficulties encountered with the prior art.

Another object of the present invention is to provide a radio telephone apparatus for performing space diversity reception to communicate with base stations in a TDMA radio communication system, which can receive satisfactorily a data signal from a specific base station in a signal reception period contained in each frame period and receive also satisfactorily a data signal from another base station other than the specific base station in a base station observation period contained in each frame period.

A further object of the present invention is to provide a radio telephone apparatus for performing space diversity reception to communicate with base stations in a TDMA radio communication system, which can receive satisfactorily a data signal from a specific base station located in a cell wherein the radio telephone apparatus is positioned in a service area in a signal reception period contained in each frame period and receive also satisfactorily a data signal from one of base stations located respectively in cells adjacent to the cell wherein the specific base station is located in the service area in a base station observation period contained in each frame period.

According to the present invention, there is provided a radio telephone apparatus for performing space diversity reception to communicate with base stations in a TDMA radio communication system under an operating condition in which a frame period containing a signal transmission period, a signal reception period and a base station observation period is provided, which comprises first and second antennas for transmitting and receiving data signals, and antenna selecting portion for selecting one of the first and second antennas in accordance with space diversity technique prior to reception of a data signal from a specific base station in the signal reception period contained in the frame period and for selecting again one of the first and second antennas in accordance with space diversity technique prior to reception of a data signal from one of base stations other than the specific base station in the base station observation period contained in the frame period.

An embodiment of radio telephone apparatus according to the present invention is used in a service area provided in the TDMA radio communication system, such as a digital cellular telephone system, to be operative to transmit the data signal through one of the first and second antennas to the specific base station in the signal transmission period preceding the signal reception period in the frame period, to receive the data signal from the specific base station through one of the first and second antennas in the signal reception period preceding the base station observation period in the frame period, and to receive the data signal from the base station other than the specific base station through one of the first and second antennas for observing a receiving condition of the data signal from another base station in the base station observation period contained in the frame period. In such a use of the embodiment of radio telephone apparatus according to the present invention, the antenna selecting portion is operative to conduct a first antenna selection in which one of the first and second antennas is selected in accordance with space diversity technique in a period between the signal transmission period and the signal receiving period and further operative to conduct distinctively a second antenna selection in which one of the first and second antennas is selected in accordance with space diversity technique in a period between the signal reception period and the base station observation period.

In the first antenna selection, a level detection output signal corresponding to a first level of the data signal from the specific base station received through the first antenna is compared with a level detection output signal corresponding to a second level of the data signal from the specific base station received through the second antenna, and then the first antenna is selected when a comparison result indicates that the first level is larger than the second level and the second antenna is selected when the comparison result indicates that the first level is smaller then or equal to the second level. Similarly, in the second antenna selection, a level detection output signal corresponding to a third level of the data signal from the base station other than the specific base station received through the first antenna is compared with a level detection output signal corresponding to a fourth level of the data signal from the base station other than specific base station received through the second antenna, and then the first antenna is selected when a comparison result indicates that the third level is larger than the fourth level and the second antenna is selected when the comparison result indicates that the third level is smaller than or equal to the fourth level.

Consequently, in the radio telephone apparatus according to the present invention, in the signal reception period contained in the frame period, the data signal from the specific base station is received through the first or second antenna which can be selected in accordance with space diversity technique immediately before the signal reception period, and in the base station observation period contained in the frame period, the data signal from the base station other than the specific base station is received to be subjected to observation of the receiving condition thereof through the first or second antenna which can be selected in accordance with space diversity technique immediately before the base station observation period. As a result, with the radio telephone apparatus according to the present invention, the data signal from the specific base station can be satisfactorily received in the signal reception period contained in the frame period and the data signal from the base station other than the specific base station can be also satisfactorily received in the base station observation period contained in the frame period.

The above, and other objects, features and advantages of the present invention will become apparent from the following detailed description taken in conjunction with the accompanying drawings.

BRIEF DESCRIPTION OF THE DRAWINGS

FIG. 4 is a illustration used for explaining a frame period provided in the embodiment shown in FIG. 3;

FIGS. 5A, 5B and 5C are time charts used for explaining operations of the embodiment shown in FIG. 3 in each frame period.

DESCRIPTION OF THE PREFERRED EMBODIMENT

Figure 1:
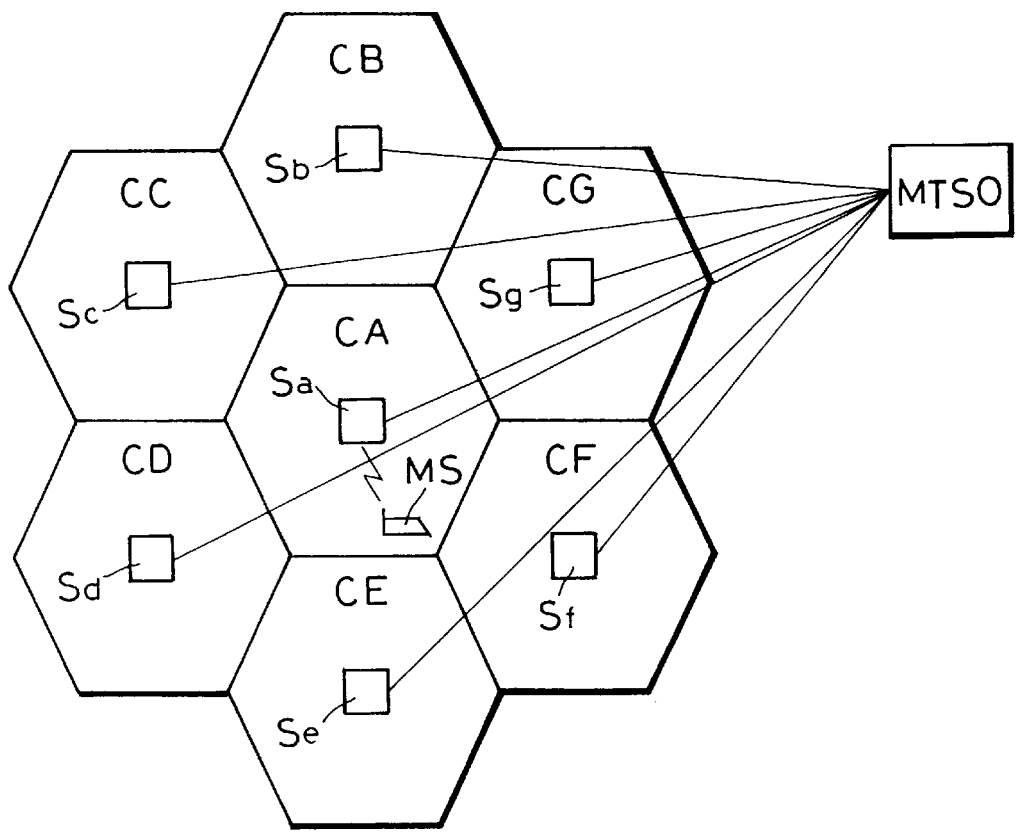
FIG. 1 is a schematic illustration showing an example of a service area provided under the digital cellular telephone system in which base stations are located.
Figure 2:
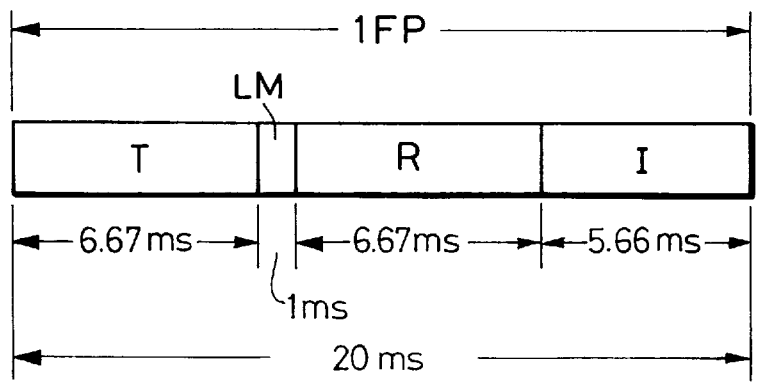
FIG. 2 is a illustration used for explaining a frame period provided in a conventional TDMA radio telephone apparatus.
Figure 3:
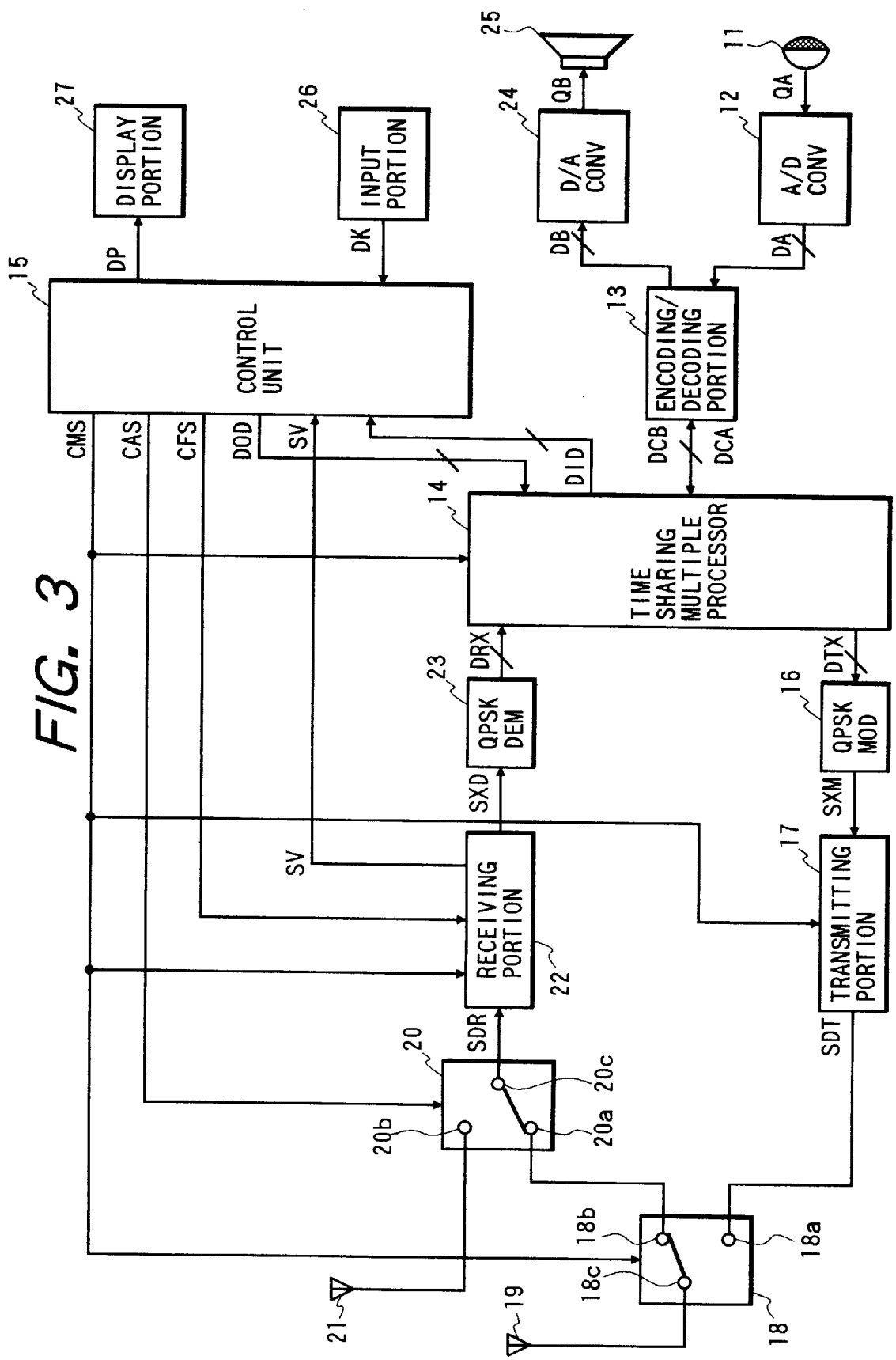
FIG. 3 is a block diagram showing an embodiment of radio telephone apparatus according to the present invention.

FIG. 3 shows an embodiment of radio telephone apparatus according to the present invention. This embodiment is used, for example, in a service area provided under a digital cellular telephone system, as shown in FIG. 1, for communicating with base stations dispersed in the service area. The communication between the embodiment and each of the base stations is made in accordance with the TDMA method. The embodiment is provided with first and second antennas in order to perform space diversity reception for receiving data signals from the base stations. In the space diversity reception, a level detection output signal corresponding to a first level of the data signal received by the first antenna is compared with a level detection output signal corresponding to a second level of the data signal received by the second antenna, and then the first antenna is selected when a comparison result indicates that the first level is larger than or equal to the second level and the second antenna is selected when the comparison result indicates that the second level is larger then or equal to the first level.

Now, referring to FIG. 3, an analog audio signal QA obtained from a microphone 11 in response to a voice input thereto is digitalized in an analog to a digital (A/D) converter 12 to produce a digital audio signal DA. The digital audio signal DA is encoded in an encoding/decoding portion 13 to produce audio data DCA which are supplied to a time sharing multiple processor 14.

A control unit 15 is provided for controlling operations of various block portions and output data DOD obtained from the control unit 15 are also supplied to the time sharing multiple processor 14. In the time sharing multiple processor 14, the audio data DCA from the encoding/decoding portion 13, the output data DOD from the control unit 15 and other data are synthesized in the manner of time sharing multiple synthesis under the control of an operation mode control signal CMS supplied from the control unit 15 to produce multiple-synthesized data DTX. The multiple-synthesized data DTX thus obtained is supplied to a QPSK modulator 16.

In the QPSK modulator 16, signal modulation with modulating data of the multiple-synthesized data DTX is carried out in accordance with the quadrature phase sift keying (QPSK) method and a digital phase-modulated signal SXM having a predetermined carrier frequency is obtained on the basis of the multiple-synthesized data DTX to be supplied from the QPSK modulator 16 to a transmitting portion 17. Then, in the transmitting portion 17, the digital phase-modulated signal SXM is subjected to frequency-conversion and other signal processes under the control of the operation mode control signal CMS supplied from the control unit 15 and thereby data signal SDT for transmission is produced to be supplied to a fixed contact 18a of a switch 18.

The switch 18 is operative to cause a movable contact 18c to be connected selectively to the fixed contact 18a and a fixed contact 18b under the control of the operation mode control signal CMS supplied from the control unit 15. The data signal SDT from the transmitting portion 17 are transmitted through an antenna 19 connected to the fixed contact 18a of the switch 18 when the movable contact 18c is connected to the fixed contact 18a in the switch 18.

On the occasion of the transmission of the data signal SDT, the embodiment shown in FIG. 3 which is, for example, installed in a vehicle is positioned in the service areas including the cells CA to CG as shown in FIG. 1. When the embodiment is positioned in the cell CA, for example, the data signal SDT transmitted through the antenna 19 is received by a base station Sa located in the cell CA.

When the movable contact 18c is connected to the fixed contact 18b in the switch 18 under the control of the operation mode control signal CMS supplied from the control unit 15, data signals transmitted from the base stations which are located respectively in the cells included in the service area as shown in FIG. 1 and includes the base station Sa located in the cell CA, are supplied though the antenna 19 and the switch 18 to a fixed contact 20a of a switch 20 connected with the fixed contact 18b of the switch 18.

An antenna 21 is connected to a fixed contact 20b of a switch 20 and the data signals transmitted from the base stations which are located respectively in the cells included in the service area shown in FIG. 1 and includes the base station Sa located in the cell CA, are supplied though the antenna 21 to the fixed contact 20b of the switch 20.

The switch 20 is operative to cause a movable contact 20c to be connected selectively to the fixed contact 20a and the fixed contact 20b under the control of an antenna selection control signal CAS supplied from the control unit 15. The data signals supplied through the antenna 19 and the switch 18 to the fixed contact 20a of the switch 20 are derived to the movable contact 20c as data signals SDR when the movable contact 20c is connected to the fixed contact 20a and the data signals supplied through the antenna 21 to the fixed contact 20b of the switch 20 are derived to the movable contact 20c as the data signals SDR when the movable contact 20c is connected to the fixed contact 20b. The data signals SDR obtained at the movable contact 20c of the switch 20 are supplied to a receiving portion 22.

In the receiving portion 22, a receiving frequency is set to correspond to, for example, a carrier frequency of one of the data signals transmitted from the base stations Sa to Sg located respectively in the cells CA to CG included in the service area shown in FIG. 1, in response to a frequency switching control signal CFS supplied from the control unit 15 under the control of the operation mode control signal CMS supplied from the control unit 15. Then, one of the data signals SDR which has the carrier frequency corresponding to the receiving frequency set in the receiving portion 22 is selected to be received. The received data signal SDR is subjected to frequency-conversion and other signal processes under the control of the operation mode control signal CMS supplied from the control unit 15 and thereby a digital phase-modulated signal SXD is produced to be supplied to a QPSK demodulator 23. In the QPSK demodulator 23, the digital phase-modulated signal SXD is demodulated in accordance with the quadrature phase shift keying (QPSK) method and received multiple-synthesized data DRX are obtained on the basis of the digital phase-modulated signal SXD to be supplied to the time sharing multiple processor 14. Further, the level of the received data signal SDR is detected in the receiving portion 22 and a detection output signal SV representing the detected level of the received data signal SDR is supplied from the receiving portion 22 to the control unit 15.

In the time sharing multiple processor 14, reproduced audio data DCB, information data DID and so on are separately obtained from the received multiple-synthesized data DRX supplied from the QPSK demodulator 23 under the control of the operation mode control signal CMS supplied from the control unit 15. The reproduced audio data DCB are supplied to the encoding/decoding portion 13 and the information data DID are supplied to the control unit 15.

In the encoding/decoding portion 13, the reproduced audio data DCB supplied from the time sharing multiple processor 14 are decoded to produce a reproduced digital audio signal DB based on the reproduced audio data DCB. The reproduced digital audio signal DB is converted to a reproduced analog audio signal QB in a digital to analog (D/A) converter 24 and the reproduced analog audio signal QB is supplied to a speaker 25 so that a voice output is obtained from the speaker 25.

A input portion 26 and a display portion 27 are connected to the control unit 15. The input portion 26 is operative to supply the control unit 15 with various input data DK when a certain manual operation, for example, a keyboard operation is conducted. The display portion 27 is operative to display conditions in operation control by the control unit 15 or the like in response to a display control signal DP supplied from the control unit 15.

Under such a structure, when the control unit 15 controls the operations of the time sharing multiple processor 14, transmitting portion 17, switches 18 and 20, receiving portion 22 and so on, a frame period as a unit period of time is provided to be repeated in the control unit 15. FIG. 4 shows an example of the frame period provided in the control unit 15.

In the frame period shown in FIG. 4, the whole duration corresponds to 20 ms as indicated with 1 FP and is divided into five segmental periods including a signal transmission period (T) of 6.67 ms, a first antenna selecting operation period (LM1) of 1 ms, a signal reception period (R) of 6.67 ms, a second antenna selecting operation period (LM2) of 3 ms, and a base station observation period (I) of 2.66 ms. That is, the first antenna selecting operation period (LM1) is provided between the signal transmission period (T) and the signal reception period (R) and the second antenna selecting operation period (LM2) is provided between the signal reception period (R) and the base station observation period (I).

The control unit 15 operates in each of successive frame periods as follows.

In the signal transmission period (T) at the head of the frame period as shown in FIG. 5A, the control unit 15 supplies the time sharing multiple processor 14, transmitting portion 17, switche 18 and receiving portion 22 with the operation mode control signal CMS having a high level and supplies also the time sharing multiple processor 14 with the output data DOD. Thereby, the audio data DCA from the encoding/decoding portion 13, the output data DOD from the control unit 15 and other data are synthesized in the manner of time sharing multiple synthesis to produce the multiple-synthesized data DTX in the time sharing multiple processor 14 and the digital phase-modulated signal SXM from the QPSK modulator 16 is subjected to the frequency conversion and other signal processes to produce the data signal SDT for transmission in the transmitting portion 17. Further, the movable contact 18c is connected to the fixed contact 18a in the switch 18 so that the antenna 19 is selected as shown in FIG. 5B and the data signal SDT from the transmitting portion 17 is transmitted through the switch 18 and the antenna 19.

In such a period, the receiving portion 22 is kept inoperative by the operation mode control signal CMS having the high level, and the receiving frequency in the receiving portion 22 has been set to be a frequency fx corresponding to the carrier frequency of the data signal transmitted from the base station located in the cell wherein the embodiment was positioned, such as the base station Sa located in the cell CA included in the service area shown in FIG. 1, in a period before the signal transmission period (T) as shown in FIG. 5C. The base station located in the cell wherein the embodiment was or is positioned is referred to a corresponding base station, hereinafter.

In the first antenna selecting operation period (LM1) provided between the signal transmission period (T) and the signal reception period (R) as shown in FIG. 5A, the control unit 15 supplies the time sharing multiple processor 14, transmitting portion 17, switche 18 and receiving portion 22 with the operation mode control signal CMS having a low level and supplies also the switch 20 with the antenna selection control signal CAS having a high level. Thereby, the movable contact 18c is connected to the fixed contact 18b in the switch 18 and the movable contact 20c is connected to the fixed contact 20a in the switch 20.

Further, the transmitting portion 17 is kept inoperative by the operation mode control signal CMS having the low and the receiving portion 22 is kept operative. The receiving frequency in the receiving portion 22 has been set to be the frequency fx corresponding to the carrier frequency of the data signal transmitted from the corresponding base station.

With the switches 18 and 20 thus connected, the antenna 19 is selected through the switches 18 and 20 to be connected with the receiving portion 22 and therefore the data signal from the corresponding base station is received through the antenna 19 and the switches 18 and 20 by the receiving portion 22 as the data signal SDR. In the receiving portion 22, the level of the data signal SDR received through the antenna 19 is detected and a first level detection output signal SV1 which forms the detection output signal SV and represents the detected level of the received data signal SDR is supplied from the receiving portion 22 to the control unit 15. The control unit 15 holds therein the first level detection output signal SV1.

Then, the control unit 15 supplies the switch 20 with the antenna selection control signal CAS having a low level. Thereby, the movable contact 20c is connected to the fixed contact 20b in the switch 20. With the switch 20 thus connected, the antenna 21 is connected through the switch 20 with the receiving portion 22 and therefore the data signal from the corresponding base station is received through the antenna 21 and the switch 20 by the receiving portion 22 as the data signal SDR. In the receiving portion 22, the level of the data signal SDR received through the antenna 21 is detected and a second level detection output signal SV2 which forms also the detection output signal SV and represents the detected level of the received data signal SDR is supplied from the receiving portion 22 to the control unit 15. The control unit 15 holds therein the second level detection output signal SV2.

The control unit 15 compares the first level detection output signal SV1 with the second level detection output signal SV2. Then, the control unit 15 supplies the switch 20 with the antenna selection control signal CAS having the high level so that the movable contact 20c is connected to the fixed contact 20a in the switch 20 when the first level detection output signal SV1 is larger than the second level detection output signal SV2. Accordingly, the antenna 19 is selected through the switches 18 and 20 to be connected with the receiving portion 22. Further, the control unit 15 supplies the switch 20 with the antenna selection control signal CAS having the low level so that the movable contact 20c is connected to the fixed contact 20b in the switch 20 when the first level detection output signal SV1 is smaller than or equal to the second level detection output signal SV2. Accordingly, the antenna 21 is selected through the switch 20 to be connected with the receiving portion 22.

As described above, in the first antenna selecting operation period (LM1), a first antenna selection is carried out for selecting one of the antennas 19 and 21, in accordance with space diversity technique, to be connected to the receiving portion in which the receiving frequency has been set to be the frequency fx corresponding to the carrier frequency of the data signal transmitted from the corresponding base station, as shown in FIG. 5B.

In the signal reception period (R) next to the first antenna selecting operation period (LM1) as shown in FIG. 5A, the control unit 15 supplies the time sharing multiple processor 14, transmitting portion 17, switche 18 and receiving portion 22 with the operation mode control signal CMS having a low level and holds the antenna selection control signal CAS in the state at the end of the first antenna selecting operation period (LM1). Thereby, the movable contact 18c is connected to the fixed contact 18b in the switch 18 and the switch 20 is held in the state at the end of the first antenna selecting operation period (LM1).

The receiving frequency in the receiving portion 22 has been set to be the frequency fx corresponding to the carrier frequency of the data signal transmitted from the corresponding base station, as shown in FIG. 5C. Accordingly, the data signal transmitted from the corresponding base station is received by the receiving portion 22 as the data signal SDR through one of the antennas 19 and 21, which has been selected to be connected to the receiving portion 22 in accordance with the space diversity technique in the first antenna selecting operation period (LM1).

In the receiving portion 22, the digital phase-modulated signal SXD based on the data signal SDR from the corresponding base station is obtained to be supplied to the QPSK demodulator 23. Further, in the time sharing multiple processor 14, the reproduced audio data DCB, the information data DID and so on are separately obtained from the received multiple-synthesized data DRX supplied from the QPSK demodulator 23 in response to the operation mode control signal CMS having the low level. Then, the reproduced audio data DCB are supplied to the encoding/decoding portion 13 and the information data DID are supplied to the control unit 15. As a result, the voice output based on the reproduced audio data DCB is obtained from the speaker 25 and the contents of the information data DID are displayed by the display portion 27.

In the second antenna selecting operation period (LM2) provided between the signal reception period (R) and the base station observation period (I) as shown in FIG. 5A, the control unit 15 supplies the time sharing multiple processor 14, transmitting portion 17, switche 18 and receiving portion 22 with the operation mode control signal CMS having the low level and supplies also the receiving portion 22 with the frequency switching control signal CFS for switching the receiving frequency in the receiving portion 22 from the frequency fx to a frequency fz corresponding to the carrier frequency of the data signal transmitted from one of the base stations other than the corresponding base station, such as one of the base stations Sb to Sg located respectively in the cells CB to CG included in the service area shown in FIG. 1. Thereby, the receiving frequency is set to be the frequency fz corresponding to the carrier frequency of the data signal transmitted from one of the base stations other than the corresponding base station in response to the frequency switching control signal CFS in the receiving portion 22. As a result, the receiving frequency in the receiving portion 22 is changed from the frequency fx to the frequency fz in the second antenna selecting operation period (LM2) as shown in FIG. 5C.

After the receiving frequency in the receiving portion 22 has been changed from the frequency fx to the frequency fz, the control unit 15 supplies the switch 20 with.the antenna selection control signal CAS having the high level. Thereby, the movable contact 18c is connected to the fixed contact 18b in the switch 18 and the movable contact 20c is connected to the fixed contact 20a in the switch 20. In this period, the receiving frequency in the receiving portion 22 has been set to be the frequency fz corresponding to the carrier frequency of the data signal transmitted from one of the base stations other than the corresponding base station.

With the switches 18 and 20 thus connected, the antenna 19 is selected through the switches 18 and 20 to be connected with the receiving portion 22 and therefore the data signal from one of the base stations other than the corresponding base station is received through the antenna 19 and the switches 18 and 20 by the receiving portion 22 as the data signal SDR. In the receiving portion 22, the level of the data signal SDR transmitted from one of the base stations other than the corresponding base station and received through the antenna 19 is detected and a third level detection output signal SV3 which forms the detection output signal SV and represents the detected level of the received data signal SDR is supplied from the receiving portion 22 to the control unit 15. The control unit 15 holds therein the third level detection output signal SV3.

Then, the control unit 15 supplies the switch 20 with the antenna selection control signal CAS having the low level. Thereby, the movable contact 20c is connected to the fixed contact 20b in the switch 20. With the switch 20 thus connected, the antenna 21 is connected through the switch 20 with the receiving portion 22 and therefore the data signal from one of the base stations other than the corresponding base station is received through the antenna 21 and the switch 20 by the receiving portion 22 as the data signal SDR. In the receiving portion 22, the level of the data signal SDR transmitted from one of the base stations other than the corresponding base station and received through the antenna 21 is detected and a fourth level detection output signal SV4 which forms also the detection output signal SV and represents the detected level of the received data signal SDR is supplied from the receiving portion 22 to the control unit 15. The control unit 15 holds therein the fourth level detection output signal SV4.

The control unit 15 compares the third level detection output signal SV3 with the fourth level detection output signal SV4. Then, the control unit 15 supplies the switch 20 with the antenna selection control signal CAS having the high level so that the movable contact 20c is connected to the fixed contact 20a in the switch 20 when the third level detection output signal SV3 is larger than the fourth level detection output signal SV4. Accordingly, the antenna 19 is selected through the switches 18 and 20 to be connected with the receiving portion 22. Further, the control unit 15 supplies the switch 20 with the antenna selection control signal CAS having the low level so that the movable contact 20c is connected to the fixed contact 20b in the switch 20 when the third level detection output signal SV3 is smaller than or equal to the fourth level detection output signal SV4. Accordingly, the antenna 21 is selected through the switch 20 to be connected with the receiving portion 22.

As described above, in the second antenna selecting operation period (LM2), a second antenna selection is carried out for selecting one of the antennas 19 and 21, in accordance with the space diversity technique, to be connected to the receiving portion 22 in which the receiving frequency has been set to be the frequency fz corresponding to the carrier frequency of the data signal transmitted from one of the base stations other than the corresponding base station, as shown in FIG. 5B.

In the base station observation period (I) next to the second antenna selecting operation period (LM2) as shown in FIG. 5A, the control unit 15 supplies continuously the time sharing multiple processor 14, transmitting portion 17, switche 18 and receiving portion 22 with the operation mode control signal CMS having the low level and holds the antenna selection control signal CAS in the state at the end of the second antenna selecting operation period (LM2). Thereby, the movable contact 18c is connected to the fixed contact 18b in the switch 18 and the switch 20 is held in the state at the end of the second antenna selecting operation period (LM2).

The receiving frequency in the receiving portion 22 has been set to be the frequency fz corresponding to the carrier frequency of the data signal transmitted from one of the base stations other than the corresponding base station, as shown in FIG. 5C. Accordingly, the data signal transmitted from one of the base stations other than the corresponding base station is received by the receiving portion 22 as the data signal SDR through one of the antennas 19 and 21, which has been selected to be connected to the receiving portion 22 in accordance with the space diversity technique in the second antenna selecting operation period (LM2).

In the receiving portion 22, the level of the data signal SDR transmitted from one of the base stations other than the corresponding base station and received through one of the antennas 19 and 21 is detected and a fifth level detection output signal SV5 which forms the detection output signal SV and represents the detected level of the received data signal SDR is supplied from the receiving portion 22 to the control unit 15. The control unit 15 observes the receiving condition of the data signal SDR from one of the base stations other than the corresponding base station in the receiving portion 22 on the strength of the fifth level detection output signal SV5 and produces the output data DOD which represents the result of the observation of the receiving condition of the data signal SDR in the receiving portion 22 to be supplied to the time sharing multiple processor 14. The time sharing multiple processor 14 holds therein the output data DOD from the control unit 15.

After the output data DOD representing the result of observation of the receiving condition of the data signal SDR from one of the base stations other than the corresponding base station in the receiving portion 22 has been supplied from the control unit 15 to the time sharing multiple processor 14, the control unit 15 supplies also the receiving portion 22 with the frequency switching control signal CFS for switching the receiving frequency in the receiving portion 22 from the frequency fz to the frequency fx corresponding to the carrier frequency of the data signal transmitted from the corresponding base station. Thereby, the receiving frequency is set to be the frequency fx corresponding to the carrier frequency of the data signal transmitted from the corresponding base station in response to the frequency switching control signal CFS in the receiving portion 22. As a result, the receiving frequency in the receiving portion 22 is changed from the frequency fz to the frequency fx in the base station observation period (I) as shown in FIG. 5C.

The operation of the control unit 15 in one frame period has finished as described above. The output data DOD representing the result of the observation of the receiving condition of the data signal SDR from one of the base stations other than the corresponding base station in the receiving portion 22 and held by the time sharing multiple processor 14 in the base station observation period (I), are used for producing the multiple-synthesized data DTX, together with the audio data DCA and other data, in the signal transmission period (T) contained in the next frame period. Accordingly, the output data DOD obtained in the base station observation period (I) for representing the result of the observation of the receiving condition of the data signal SDR from one of the base stations other than the corresponding base station in the receiving portion 22, are contained in the data signal STD for transmission and transmitted from the transmitting portion 17 through the switch 18 and the antenna 19 to the corresponding base station in the signal transmission period (T) contained in the next frame period. Consequently, the receiving condition of the data signal from one of the base stations other than the corresponding base station is observed and the result of the observation is reported to the corresponding base station.

The control unit 15 may comprise a microcomputer. One example of an operation program for the microcomputer constituting the control unit 15 for operating in each frame period as described above is carried out in accordance with flow charts shown in FIGS. 6A and 6B.

Figure 6A:
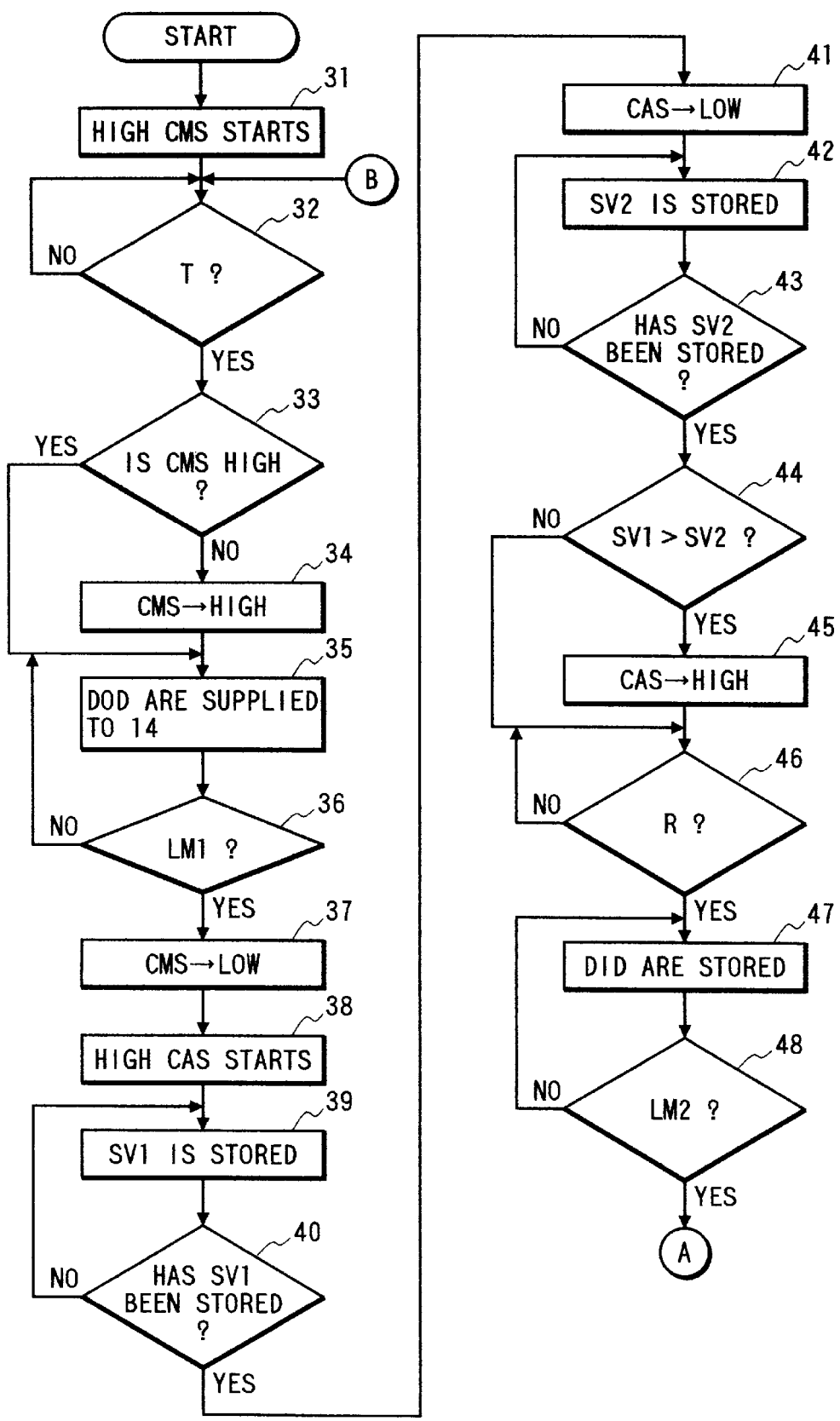
FIGS. 6A and 6B are flow charts showing an example of an operational program for microcomputer used in a control unit employed in the embodiment shown in FIG. 3.
Figure 6B:
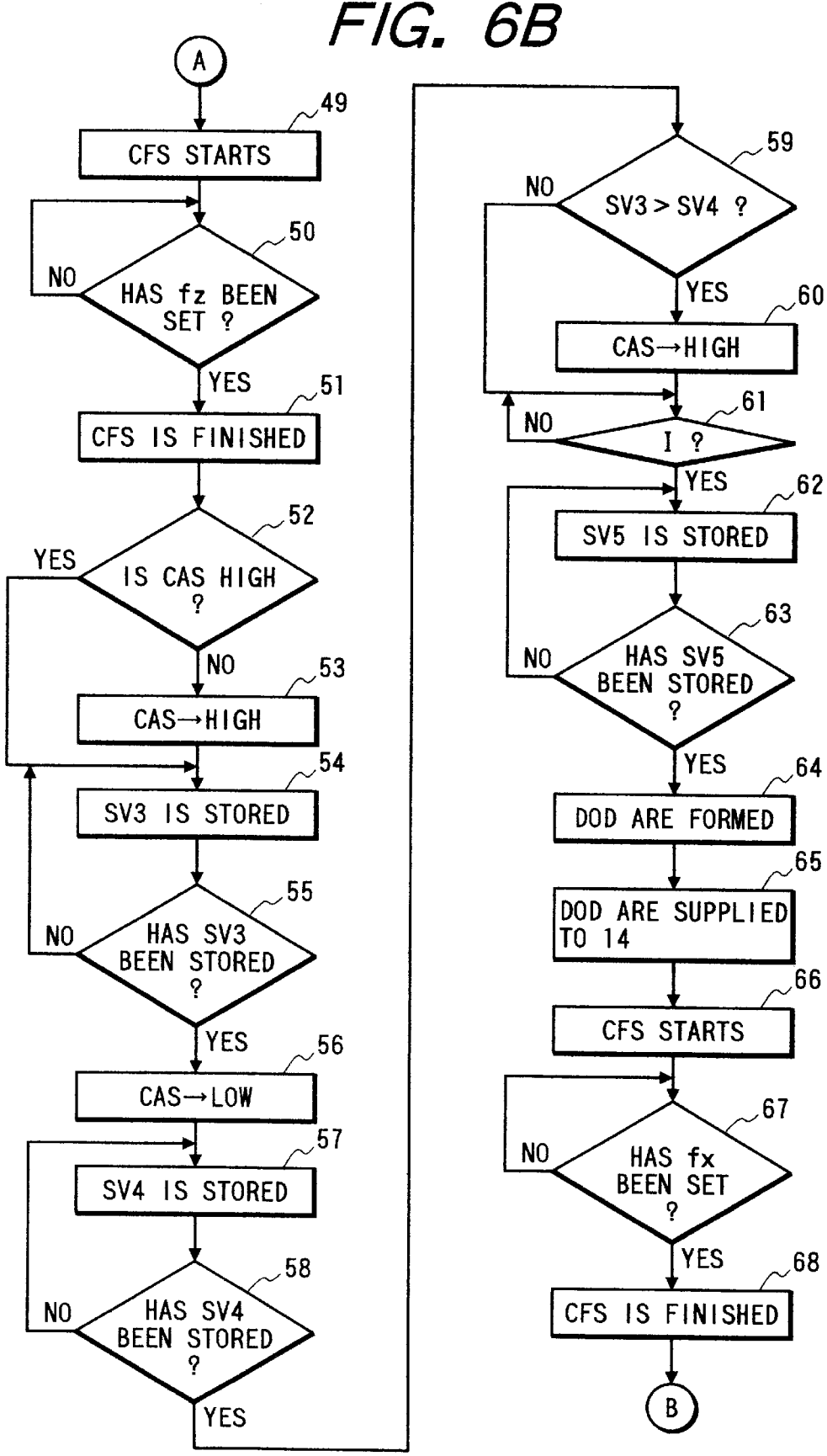

According to the flow chart shown in FIG. 6A, the program starts in a condition wherein the receiving frequency in the receiving portion 22 has been set to be the frequency fx. After the start, first, in step 31, the operation mode control signal CMS having the high level starts to be supplied to the time sharing multiple processor 14, transmitting portion 17, switche 18 and receiving portion 22 and then it is checked whether the signal transmission period (T) has come or not, in step 32. If the signal transmission period (T) has not come, the check in the step 32 is repeated. When it is clarified in the step 32 that the signal transmission period (T) has come, it is also checked whether the operation mode control signal CMS has the high level or not, in step 33. If the operation mode control signal CMS does not have the high level, the operation mode control signal CMS is changed to have the high level, in step 34, and the process is advanced to step 35. If the operation mode control signal CMS has the high level, the process is advanced from the step 33 to the step 35.

In the step 35, the output data DOD are supplied to the time sharing multiple processor 14. Then, in step 36, it is checked whether the first antenna selecting operation period (LM1) has come or not. If the first antenna selecting operation period (LM1) has not come, the process returns to the step 35. When it is clarified in the step 36 that the first antenna selecting operation period (LM1) has come, the operation mode control signal CMS is changed to have the low level, in step 37, and the antenna selection control signal CAS having the high level starts to be supplied to the switch 20, in step 38.

Next, the first level detection output signal SV1 which forms the detection output signal SV and is obtained from the receiving portion 22 is stored, in step 39, and it is clarified whether the first level detection output signal SV1 has been fully stored or not, in step 40. If the first level detection output signal SV1 has not been fully stored, the process returns to the step 39. When it is clarified in the step 40 that the first level detection output signal SV1 has been fully stored, the antenna selection control signal CAS is changed to have the low level, in step 41.

Then, the second level detection output signal SV2 which forms also the detection output signal SV and is obtained from the receiving portion 22 is stored, in step 42, and it is clarified whether the second level detection output signal SV2 has been fully stored or not, in step 43. If the second level detection output signal SV2 has not been fully stored, the process returns to the step 42. When it is clarified in the step 43 that the second level detection output signal SV2 has been fully stored, it is checked whether the first level detection output signal SV1 is larger than the second level detection output signal SV2 or not, in step 44.

If it is clarified in the step 44 that the first level detection output signal SV1 is larger than the second level detection output signal SV2, the antenna selection control signal CAS is changed to have the high level, in step 45, and the process is advanced to step 46. If it is clarified in the step 44 that the first level detection output signal SV1 is smaller than or equal to the second level detection output signal SV2, the process is advanced from the step 44 to the step 46.

In the step 46, it is checked whether the signal reception period (R) has come or not. If the signal reception period (R) has not come, the check in the step 46 is repeated. When it is clarified in the step 46 that the signal reception period (R) has come, the information data DID obtained from the time sharing multiple processor 14 are stored, in step 47.

Then, in step 48, it is checked whether the second antenna selecting operation period (LM2) has come or not. If the second antenna selecting operation period (LM2) has not come, the process returns to the step 47. When it is clarified in the step 48 that the second antenna selecting operation period (LM2) has come, the frequency switching control signal CFS for switching the receiving frequency in the receiving portion 22 from the frequency fx to the frequency fz starts to be supplied to the signal receiving portion 22, in step 49.

After that, it is checked whether the receiving frequency in the receiving portion 22 has been set to be the frequency fz or not, in step 50. If the receiving frequency in the receiving portion 22 has not been set to be the frequency fz, the check in the step 50 is repeated. When it is clarified in the step 50 that the receiving frequency in the receiving portion 22 has been set to be the frequency fz, the frequency switching control signal CFS is finished to be supplied to the signal receiving portion 22, is step 51, and the process is advanced to step 52.

In the step 52, it is checked whether the antenna selection control signal CAS has the high level or not. If the antenna selecting control signal CAS does not have the high level, the antenna selecting control signal CAS is changed to have the high level, in step 53, and the process is advanced to step 54. If the antenna selecting control signal CAS has the high level, the process is advanced from the step 52 to the step 54.

In the step 54, the third level detection output signal SV3 which forms the detection output signal SV and is obtained from the receiving portion 22 is stored, and it is clarified whether the third level detection output signal SV3 has been fully stored or not, in step 55. If the third level detection output signal SV3 has not been fully stored, the process returns to the step 54. When it is clarified in the step 55 that the third level detection output signal SV3 has been fully stored, the antenna selection control signal CAS is changed to have the low level, in step 56.

Then, in the step 57, the fourth level detection output signal SV4 which forms also the detection output signal SV and is obtained from the receiving portion 22 is stored, and it is checked whether the fourth level detection output signal SV4 has been fully stored or not, in step 58. If the fourth level detection output signal SV4 has not been fully stored, the process returns to the step 57. When it is clarified in the step 58 that the fourth level detection output signal SV4 has been fully stored, it is checked whether the third level detection output signal SV3 is larger than the fourth level detection output signal SV4 or not, in step 59.

If it is clarified in the step 59 that the third level detection output signal SV3 is larger than the fourth level detection output signal SV4, the antenna selection control signal CAS is changed to have the high level, in step 60, and the process is advanced to step 61. If it is clarified in the step 59 that the third level detection output signal SV3 is smaller than or equal to the fourth level detection output signal SV4, the process is advanced from the step 59 to the step 61.

In the step 61, it is checked whether the base station observation period (I) has come or not. If the base station observation period (I) has not come, the check in the step 61 is repeated. When it is clarified in the step 61 that the base station observation period (I) has come, the fifth level detection output signal SV5 which forms the detection output signal SV and is obtained from the receiving portion 22 is stored, in step 62, and it is checked whether the fifth level detection output signal SV5 has been fully stored or not, in step 63. If the fifth level detection output signal SV5 has not been fully stored, the process returns to the step 62. When it is clarified in the step 63 that the fifth level detection output signal SV5 has been fully stored, the output data DOD which represents the result of the observation of the receiving condition of the data signal SDR from one of the base stations other than the corresponding base station in the receiving portion 22 are formed on the strength of the fifth level detection output signal SV5, in step 64.

Next, in step 65, the output data DOD formed in the step 64 are supplied to the time sharing multiple processor 14. Then, the frequency switching control signal CFS for switching the receiving frequency in the receiving portion 22 from the frequency fr to the frequency fx starts to be supplied to the signal receiving portion 22, in step 66.

After that, it is checked whether the receiving frequency in the receiving portion 22 has been set to be the frequency fx or not, in step 67. If the receiving frequency in the receiving portion 22 has not been set to be the frequency fx, the check in the step 67 is repeated. When it is clarified in the step 67 that the receiving frequency in the receiving portion 22 has been set to be the frequency fx, the frequency switching control signal CFS is finished to be supplied to the signal receiving portion 22, is step 68, and the process returns to the step 32.

What is claimed is:

1. A radio telephone apparatus for performing space diversity reception to communicate with a plurality of base stations in a TDMA radio communication system under an operating condition in which a frame period containing a signal transmission period, a signal reception period and a base station observation period is provided, the apparatus comprising:

first and second antenna means for transmitting and receiving a plurality of data signals, and antenna selecting means for selecting one of said first and second antenna means in accordance with a space diversity technique prior to reception of a data signal from a specific base station of said plurality of base stations in the signal reception period contained in the frame period and for selecting again one of said first and second antenna means in accordance with the space diversity technique prior to reception of a data signal from one of said plurality of base stations other than said specific base station in the base station observation period contained in the frame period.

2. The radio telephone apparatus according to claim 1, wherein the signal transmission period precedes the signal reception period in the frame period and said antenna selecting means is operative to conduct a first antenna selection in which one of said first and second antenna means is selected in accordance with the space diversity technique in a period between said signal transmission period and said signal receiving period.

3. The radio telephone apparatus according to claim 2, wherein said antenna selecting means is operative to conduct said first antenna selection by comparing a level detection output signal corresponding to a first level of the data signal from said specific base station of said plurality of base stations received through the first antenna means with a level detection output signal corresponding to a second level of the data signal from said specific base station received through the second antenna means, for selecting the first antenna means when a comparison result indicates that the first level is larger than the second level and for selecting the second antenna means when the comparison result indicates that the first level is smaller than or equal to the second level.

4. The radio telephone apparatus according to claim 1, wherein the signal reception period precedes the base station observation period in the frame period and said antenna selecting means is operative to conduct a second antenna selection in which one of said first and second antenna means is selected in accordance with the space diversity technique in a period between said signal reception period and said base station observation period.

5. The radio telephone apparatus according to claim 4, wherein said antenna selecting means is operative for conducting said second antenna selection by comparing a level detection output signal corresponding to a third level of the data signal from said one of said plurality of base stations other than said specific base station received through the first antenna means with a level detection output signal corresponding to a fourth level of the data signal from said one of said plurality of base stations other than said specific base station received through the second antenna means, for selecting the first antenna means when a comparison result indicates that the third level is larger than the fourth level and for selecting the second antenna means when the comparison result indicates that the third level is smaller than or equal to the fourth level.

6. The radio telephone apparatus according to claim 4, wherein said antenna selecting means is further operative to produce output data representing a result of observation of a receiving condition of the data signal from said one of said plurality of base stations other than said specific base station received in the base station observation period through one of the first and second antenna means selected by the second antenna selection of said antenna selecting means and to supply said output data to be transmitted in the signal transmission period next to said base station observation period.

7. A radio telephone apparatus for performing space diversity reception to communicate with a plurality of base stations in a TDMA radio communication system under an operating condition in which a frame period containing a signal transmission period, a signal reception period and a base station observation period is provided, the apparatus comprising:

first and second antenna means for transmitting and receiving a plurality of data signals, antenna selecting means for selecting one of said first and second antenna means in accordance with a space diversity technique prior to reception of a data signal from a specific base station in the signal reception period contained in the frame period and for selecting again one of said first and second antenna means in accordance with the space diversity technique prior to reception of a data signal from one of said plurality of base stations other than said specific base station in the base station observation period contained in the frame period, and signal receiving means operative to receive the data signal from said specific base station through one of said first and second antenna means selected by said antenna selecting means in the signal reception period contained in the frame period and to receive the data signal from said one of said plurality of base stations other than said specific base station through one of said first and second antenna means selected by said antenna selecting means in the base station observation period.

8. The radio telephone apparatus according to claim 7, wherein the signal transmission period precedes the signal reception period and the signal reception period precedes the base station observation period in the frame period, and said antenna selecting means is operative to conduct a first antenna selection in which one of said first and second antenna means is selected in accordance with the space diversity technique in a period between said signal transmission period and said signal receiving period and is operative further to conduct a second antenna selection in which one of said first and second antenna means is selected in accordance with the space diversity technique in the period between said signal reception period and said base station observation period.

9. The radio telephone apparatus according to claim 8, wherein said antenna selecting means is operative for conducting said first antenna selection by comparing a level detection output signal corresponding to a first level of the data signal from said specific base station received through the first antenna means by the signal receiving means with a level detection output signal corresponding to a second level of the data signal from said specific base station received through the second antenna means by the signal receiving means, for selecting the first antenna means when a comparison result indicates that the first level is larger than the second level and for selecting the second antenna means when the comparison result indicates that the first level is smaller than or equal to the second level.

10. The radio telephone apparatus according to claim 8, wherein said antenna selecting means is operative for conducting said second antenna selection by comparing a level detection output signal corresponding to a third level of the data signal from said one of said plurality of base stations other than said specific base station received through the first antenna means by the signal receiving means with a level detection output signal corresponding to a fourth level of the data signal from said one of said plurality of base stations other than said specific base station received through the second antenna means by the signal receiving means, for selecting the first antenna means when a comparison result indicates that the third level is larger than the fourth level and for selecting the second antenna means when the comparison result indicates that the third level is smaller than or equal to the fourth level.

11. The radio telephone apparatus according to claim 8 further comprising signal transmitting means operative to transmit a data signal through one of the first and second antenna means in the signal transmission period contained in the frame period.

12. The radio telephone apparatus according to claim 11, wherein said antenna selecting means is further operative to produce output data representing a result of observation of a receiving condition of the data signal from said one of said plurality of base stations other than said specific base station received by the signal receiving means in the base station observation period through one of the first and second antenna means selected by the second antenna selection and to supply said output data to be transmitted by the signal transmitting means in the signal transmission period next to said base station observation period.

13. A radio telephone apparatus for performing space diversity reception to communicate with a plurality of base stations in a TDMA radio communication system under an operating condition in which a frame period containing a signal transmission period, a signal reception period and a base station observation period is provided, the apparatus comprising;

first and second antenna means for transmitting and receiving a plurality of data signals, antenna selecting means for selecting one of said first and second antenna means in accordance with a space diversity technique prior to reception of a data signal from a specific base station of said plurality of base stations in the signal reception period contained in the frame period and for selecting again one of said first and second antenna means in accordance with the space diversity technique prior to reception of a data signal from one of said plurality of base stations other than said specific base station in the base station observation period contained in the frame period, wherein one of said first and second antenna means used for receiving the data signal from said one of said plurality of base stations other than said specific base station in the base station observation period is selected to be optimized independently of the other of said first and second antenna means.

14. The radio telephone apparatus according to claim 13, wherein the signal transmission period precedes the signal reception period in the frame period and said antenna selecting means is operative to conduct a first antenna selection in which one of said first and second antenna means is selected in accordance with the space diversity technique in a period between said signal transmission period and said signal receiving period.

15. The radio telephone apparatus according to claim 14, wherein said antenna selecting means is operative for conducting said first antenna selection to compare a level detection output signal corresponding to a first level of the data signal from said specific base station received through the first antenna means with a level detection output signal corresponding to a second level of the data signal from said specific base station received through the second antenna means, for selecting the first antenna means when a comparison result indicates that the first level is larger than the second level and for selecting the second antenna means when the comparison result indicates that the first level is smaller than or equal to the second level.

16. The radio telephone apparatus according to claim 13, wherein the signal reception period precedes the base station observation period in the frame period and said antenna selecting means is operative to conduct a second antenna selection in which one of said first and second antenna means is selected in accordance with the space diversity technique in a period between said signal reception period and said base station observation period.

17. The radio telephone apparatus according to claim 14, wherein said antenna selecting means is operative for conducting said second antenna selection to compare a level detection output signal corresponding to a fourth level of the data signal from said one of said plurality of base stations other than said specific base station received through the second antenna means, for selecting the first antenna means when a comparison result indicates that the third level is larger than the fourth level and for selecting the second antenna means when the comparison result indicates that the third level is smaller than or equal to the fourth level.

18. The radio telephone apparatus according to claim 16, wherein said antenna selecting means is further operative to produce output data representing a result of observation of a receiving condition of the data signal from said one of said plurality of base stations other than said specific base station received in the base station observation period through one of the first and second antenna means selected by the second antenna selection and to supply said output data to be transmitted in the signal transmission period next to said base station observation period.

* * * * *